United States Patent [19]

Fresenius et al.

[11] 4,043,932

[45] Aug. 23, 1977

[54] WATER STERILIZING AGENT

[75] Inventors: Wilhelm Fresenius, Wiesbaden; Remigius Fresenius, Heidenrod-Zorn; Ludwig Fresenius, Wiesbaden; Wilhelm Schneider, Heidenrod, all of Germany

[73] Assignee: Erfindergesellschaft Fresenius, Taunusstein, Germany

[21] Appl. No.: 633,963

[22] Filed: Nov. 21, 1975

[30] Foreign Application Priority Data

July 9, 1975 Germany ............................ 2530487

[51] Int. Cl.² .......................................... E11D 3/395
[52] U.S. Cl. ........................................ 252/95; 252/94; 252/106; 252/187 H; 424/132; 424/149; 210/64

[58] Field of Search .................. 252/94, 95, 106, 187; 424/132, 149; 210/64

[56] References Cited

U.S. PATENT DOCUMENTS

| 2,320,280 | 5/1943 | Kaludian | 252/95 |
| 2,396,515 | 3/1946 | Freidl et al. | 424/132 |

OTHER PUBLICATIONS

Grant, "Hackh's Chemical Dictionary", 1969, p. 114.

*Primary Examiner*—Mayer Weinblatt

[57] ABSTRACT

A chlorine and silver-containing water sterilizing agent, comprising a sodium-silver-chloride complex consisting of a water-soluble silver compound and sodium chloride, and an excess of sodium chloride.

5 Claims, No Drawings

WATER STERILIZING AGENT

BACKGROUND OF THE INVENTION

Products for processing and sterilizing drinking water consisting of mixtures of silver sulfate or silver nitrate and sodium chloride are already on the retail market. These products are added to the drinking water in small quantities which are sufficient to keep the water permanently sterilized and fresh by virtue of the bactericidal action of the silver compounds. However, the disadvantage of these known agents is that they must be stored in the dark as they are not light-resistant. When products of this kind are exposed to light, black dots become apparent in them after only a short period of exposure owing to the reduction of the silver compounds to form metallic silver.

SUMMARY OF THE INVENTION

The object of the present invention is to produce a light-resistant, silver-based product for sterilizing water as it is extremely troublesome to have to keep such products constantly in the dark. Another object of the invention is to produce agents which, in addition to keeping water permanently fresh, immediately sterilize water having a high bacterial content, which was impossible with silver compounds alone, such agents having a higher activity than the known agents and retaining their biological effectiveness for a long period of time.

The light-resistant chlorine and silver-containing water sterilizing agents according to the invention are characterized in that they contain a sodium-silver-chloride-complex consisting of a water soluble silver compound and sodium chloride in addition to excess sodium chloride. The excess amount of sodium chloride should be relatively large and the mol. ratio of the complex bound silver relative to the total amount of complex bound sodium chloride plus free sodium chloride is 1:10 to 1:10,000, preferably 1:100 to 1:3,000, more particularly, 1:200 to 1:2,000.

Water sterilizing agents of this kind can be produced in an aqueous solution or in the dry state — the latter by crystallizing out and evaporating the water. They remain active and can be stored for many years without any change; it is not possible to detect any reduction in their effectiveness through exposure to light. The product remains completely white and it is not possible to detect any reduction of the silver such as occurs in the case of the known products.

The silver compounds for producing the sodium-silver-chloride complex compound contained in the product according to the invention can consist of various water-soluble silver compounds such as silver sulfate or silver nitrate. Silver sulfate is preferred, mainly because it is allowed under the drinking water processing regulations. The silver concentration in the product according to the invention can vary within a broad range as long as there is a large excess of sodium chloride present. The products according to the invention have an excellent oligodynamic action with respect to microorganisms and keep water permanently fresh - even still water such as in tanks holding drinking water and swimming pools.

Description of the Preferred Embodiments

According to the invention, a special process is used to obtain the product according to the invention, i.e., the sodium-silver-chloride complex compound mixed with an excess amount of sodium chloride. According to this process an aqueous solution of the water soluble silver compound, such as silver sulfate, is poured into a highly concentrated, preferably saturated sodium chloride solution; the mixture being stirred constantly. The quantities of the two compounds which are mixed together are such that the reaction mixtures always contains an excess of sodium chloride relative to the amount of complex binding sodium chloride. It is also advantageous if the mol. ratio of the silver compound and the sodium chloride is selected in the range of 1:10 to 1:10,000, preferably 1:100 to 1:3,000 and, more especially, in the range of 1:200 to 1:2,000.

Silver compounds such as the sodium-silver-chloride-complex contained in the product according to the invention act slowly when there are high bacterial counts, i.e., in excess of 5,000 germs per ml, or in the case of a high organic charge. However, they do have a long lasting effect. For this reason, in certain cases when there is a marked initial bacterial action it is advisable to use a sterilizing agent which has an immediate sterilizing effect, i.e., through splitting off chlorine, in addition to its long term effect.

However, tests carried out in connection with the invention show that mixtures of the sodium-silver-chloride complex-containing compounds which split off chlorine cannot be stored and that the chlorine-containing compounds rapidly lose their sterilizing efficacy during storage. This reduction in the sterilizing action is particularly noticeable under damp conditions but it also occurs in the dry state.

Surprisingly, it has been found that the above-mentioned reduction in effectiveness of the compounds splitting off chlorine can be avoided by adding a buffer substance to the product. When the product is to be used for sterilizing drinking water, the buffer substance must be acceptable under the laws governing foodstuffs. Alkali hydrogen carbonates, more particularly, sodium hydrogen carbonate have proved particularly suitable. Hypochlorite, more particularly, calcium hypochlorite has proved to be a particularly suitable compound splitting of chlorine. Thus, a preferred water sterilizing product according to the invention consists of an intimate dry mixture of:

a. a sodium-silver-chloride complex consisting of a water soluble silver compound, more particularly, a silver sulfate and sodium chloride,
b. excess sodium chloride,
c. calcium hypochlorite and
d. sodium hydrogen carbonate.

When mixing these preferred agents, it is preferable to first mix together in the dry state the calcium hypochlorite or another compound splitting of chlorine and the buffer substance, more particularly, sodium hydrogen carbonate, and then to add to this initial mixture the mixture consisting of the sodium-silver-chloride complex and excess sodium chloride which has been prepared in the above manner and converted to the dry state.

The buffer substance, preferably alkali hydrogen carbonate, more particularly sodium hydrogen carbonate is preferably added to the water sterilizing agent according to the invention in a quantity of 30 to 95% weight, more particularly, 70–90% by weight relative to the combined sodium-silver-chloride complex, the excess sodium chloride, the buffer substance and the compound splitting off chlorine. The compound splitting off chlorine, preferably a hypochlorite is added to the mixture in a substantially smaller quantity, generally 0.1 – 5% by weight and preferably 0.5 – 2% by weight relative to the weight of the combined sodium-silver-chloride complex, buffer substance and compound splitting off chlorine.

It is obviously also possible to add additional components to the sterilizing agent. They can be added merely as diluting agents or they can have additional functions. The diluting agents can be water or inert salts which do not interfere with the function of the active components in the product. However, water should only be added if the product does not contain a compound splitting off chlorine under the action of water. The above percentages by weight do not take into account additional components of this kind but are merely calculated on the basis of a combination of the four components basic to the invention.

The chlorine content in the form of the compound splitting off chlorine can be regulated so that the treated water does not smell or taste of chlorine. By adjusting the calcium hypochlorite concentration accordingly, a chlorine content of only 0.2 to 0.3 mg per l. water and a silver content of 0.1 mg per l. water can be employed if 1'g of the product is added to 100 l. water. An especially suitable initial quantity of active chlorine after dissolution of the preparation in the water to be sterilized is 0.2 mg per l. water.

The following examples serves to illustrate the invention and describe the method of producing three different water sterilizing agents according to the invention.

EXAMPLE 1

A liquid water sterilizing agent having a long lasting effect.

14.5g silver sulfate were dissolved in 4 liters distilled water and then poured under constant stirring into a container containing 5.4 kg sodium chloride dissolved in 13 l. water. After stirring in the solution, the mixture was increased to 20 l. by adding distilled water: the mixture being stirred constantly. If undissolved components remained, the solution was filtered. The liquid product was then ready for use.

EXAMPLE 2

Solid water sterilizing agent having a long lasting effect.

72.3 g silver sulfate were dissolved in 8 l. distilled water and poured into a solution containing 4930 G sodium chloride dissolved in 14 l. distilled water. The mixture was stirred for a long period of time and then the solution was carefully evaporated to dry in a vacuum. The dry white substance concentrated by evaporation was homogenized by milling and then redried. The solid mixture contained 1% silver as the sodium-silver-chloride complex. Thus, when 1 g was added to 100 l. water, the water contained 0.1mg silver per liter water which is in conformity with the provisions of the drinking water processing regulations. The product could be stored for several years with exposure to light without any change in its appearance.

EXAMPLE 3

Solid water sterilizing agent having a combined long lasting and rapid acting sterilizing effect.

90g sodium hydrogen carbonate and 0.72g calcium hypochlorite were mixed together in the dry state. 10g of the dry sterilizing agent prepared according to Example 2 were then added to this mixture. The mixture was homogeneously and intimately mixed. The product could be stored for at least 1 year in the dry state.

What is claimed is:

1. a dry, light-resistant, silver-based composition for sterilizing water, consisting essentially of (1) a sodium-silver-chloride complex, (2) an excess of sodium chloride, the mol ratio of the complex bound silver to the total amount of complex bound and free sodium chloride being 1:10 to 1:10,000, (3) 30 to 95% by weight of the composition of an alkali hydrogen carbonate as a buffer and (4) 0.1–5% by weight of the composition of calcium hypochlorite capable of splitting off chlorine.

2. The composition of claim 1 wherein the buffer is is sodium hydrogen carbonate.

3. The composition of claim 1 wherein the complex is the reaction product of silver sulfate and sodium sulfate.

4. The composition of claim 1, wherein the mol ratio of the complex bound silver to the total amount of complex bound and free sodium chloride is 1:100 to 1:300.

5. The composition of claim 1, wherein the mol ratio of the complex bound silver to the total amount of complex bound and free sodium chloride is 1:200 to 1:2000.

* * * * *